United States Patent
Takeda et al.

(10) Patent No.: US 11,751,226 B2
(45) Date of Patent: Sep. 5, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/962,678

(22) PCT Filed: Jan. 19, 2018

(86) PCT No.: PCT/JP2018/001654
§ 371 (c)(1),
(2) Date: Jul. 16, 2020

(87) PCT Pub. No.: WO2019/142332
PCT Pub. Date: Jul. 25, 2019

(65) Prior Publication Data
US 2020/0367255 A1     Nov. 19, 2020

(51) Int. Cl.
*H04W 76/27* (2018.01)
*H04W 72/53* (2023.01)
*H04W 72/0446* (2023.01)
*H04W 72/1263* (2023.01)
*H04W 80/08* (2009.01)

(52) U.S. Cl.
CPC ....... *H04W 72/53* (2023.01); *H04W 72/0446* (2013.01); *H04W 72/1263* (2013.01); *H04W 76/27* (2018.02); *H04W 80/08* (2013.01)

(58) Field of Classification Search
CPC ............. H04W 72/0493; H04W 76/27; H04W 72/0446; H04W 72/1263; H04W 80/08;
(Continued)

(56) References Cited

U.S. PATENT DOCUMENTS

2015/0208382 A1* 7/2015 Yao ............... H04W 72/0446
                                                        370/280
2016/0044610 A1* 2/2016 Hwang ............ H04W 52/08
                                                        370/280
(Continued)

FOREIGN PATENT DOCUMENTS

CN       105594264 A       5/2016
JP       2015-524221 A     8/2015
(Continued)

OTHER PUBLICATIONS

International Search Report issued in PCT/JP2018/001654 dated Mar. 20, 2018 (2 pages).

(Continued)

*Primary Examiner* — Lakeram Jangbahadur
(74) *Attorney, Agent, or Firm* — Osha Bergman Watanabe & Burton LLP

(57) ABSTRACT

A user terminal according to one aspect of the present disclosure includes: a transmitting/receiving section that performs transmission and/or reception based on an Uplink-Downlink (UL-DL) configuration; and a control section that controls switching of the UL-DL configuration based on update information of the UL-DL configuration notified via a higher layer signaling, and the control section performs the switching at a timing that comes after a specific timing and satisfies a given condition. According to one aspect of the present disclosure, even when a UL-DL configuration is semi-statically configured to be changed in an RRC connected state, it is possible to reflect the change at an appropriate timing.

4 Claims, 12 Drawing Sheets

(58) Field of Classification Search
CPC ..... H04W 28/06; H04W 72/04; H04W 99/00; H04B 7/24; H04B 7/25; H04B 7/26
See application file for complete search history.

(56) References Cited

U.S. PATENT DOCUMENTS

| | | | | |
|---|---|---|---|---|
| 2016/0113037 | A1* | 4/2016 | Mizusawa | H04W 74/0833 370/280 |
| 2017/0013605 | A1* | 1/2017 | Li | H04W 76/23 |
| 2017/0142618 | A1* | 5/2017 | Hahn | H04W 76/27 |
| 2019/0207662 | A1* | 7/2019 | Zhou | H04L 5/0048 |
| 2020/0314946 | A1* | 10/2020 | Tsuboi | H04W 24/10 |

FOREIGN PATENT DOCUMENTS

| | | |
|---|---|---|
| WO | 2014/188811 A1 | 11/2014 |
| WO | 2017007556 A1 | 1/2017 |

OTHER PUBLICATIONS

Written Opinion of the International Searching Authority issued in PCT/JP2018/001654 dated Mar. 20, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Application No. 18900858.4 dated Aug. 3, 2021 (8 pages).

ETRI; "URLLC Based on grant-based Dynamic TDD"; 3GPP TSG RAN WG1 Meeting #91, R1-1720232; Reno, USA, Nov. 27-Dec. 1, 2017 (4 pages).

Office Action issued in Japanese Application No. 2019-565665; dated Feb. 15, 2022 (6 pages).

\* cited by examiner

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

Legacy LTE systems (e.g., LTE Rel. 8 to 13) perform communication on Downlink (DL) and/or Uplink (UL) by using subframes of 1 ms as a scheduling unit. The subframe includes 14 symbols of 15 kHz in Sub-Carrier Spacing (SCS) in a case of, for example, a Normal Cyclic Prefix (NCP).

Furthermore, the legacy LTE systems support Time Division Duplex (TDD) and/or Frequency Division Duplex (FDD). According to TDD, a transmission direction of each subframe is semi-statically controlled based on a UL/DL configuration that defines the transmission direction (UL and/or DL) of each subframe in a radio frame.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (also referred to simply as NR) to make it possible to control a transmission direction in various time units (such as frames, subframes, slots, subslots or symbols).

For example, NR may support control of the transmission direction based on a cell-specific UL-DL configuration, a UE-specific UL-DL configuration, and Slot Format Information or a Slot Format Indicator (SFI).

Information of the cell-specific UL-DL configuration and the UE-specific UL-DL configuration is assumed to be semi-statically configured to a UE. However, study on from when to perform an operation based on a post-change configuration in a case where such a change notification of the semi-static UL-DL configuration is received in a Radio Resource Control connected (RRC connected) state has not yet advanced. Unless an appropriate change timing is used, there is a risk that recognition of the transmission direction does not match between the UE and a base station, and a communication throughput and frequency use efficiency deteriorate.

It is therefore one of objects of the present disclosure to provide a user terminal and a radio communication method that, even when a UL-DL configuration is semi-statically configured to be changed in an RRC connected state, can reflect the change at an appropriate timing.

Solution to Problem

A user terminal according to one aspect of the present disclosure includes: a transmitting/receiving section that performs transmission and/or reception based on an Uplink-Downlink (UL-DL) configuration; and a control section that controls switching of the UL-DL configuration based on update information of the UL-DL configuration notified via a higher layer signaling, and the control section performs the switching at a timing that comes after a specific timing and satisfies a given condition.

Advantageous Effects of Invention

According to one aspect of the present disclosure, even when a UL-DL configuration is semi-statically configured to be changed in an RRC connected state, it is possible to reflect the change at an appropriate timing.

DESCRIPTION OF EMBODIMENTS

Figure 1:
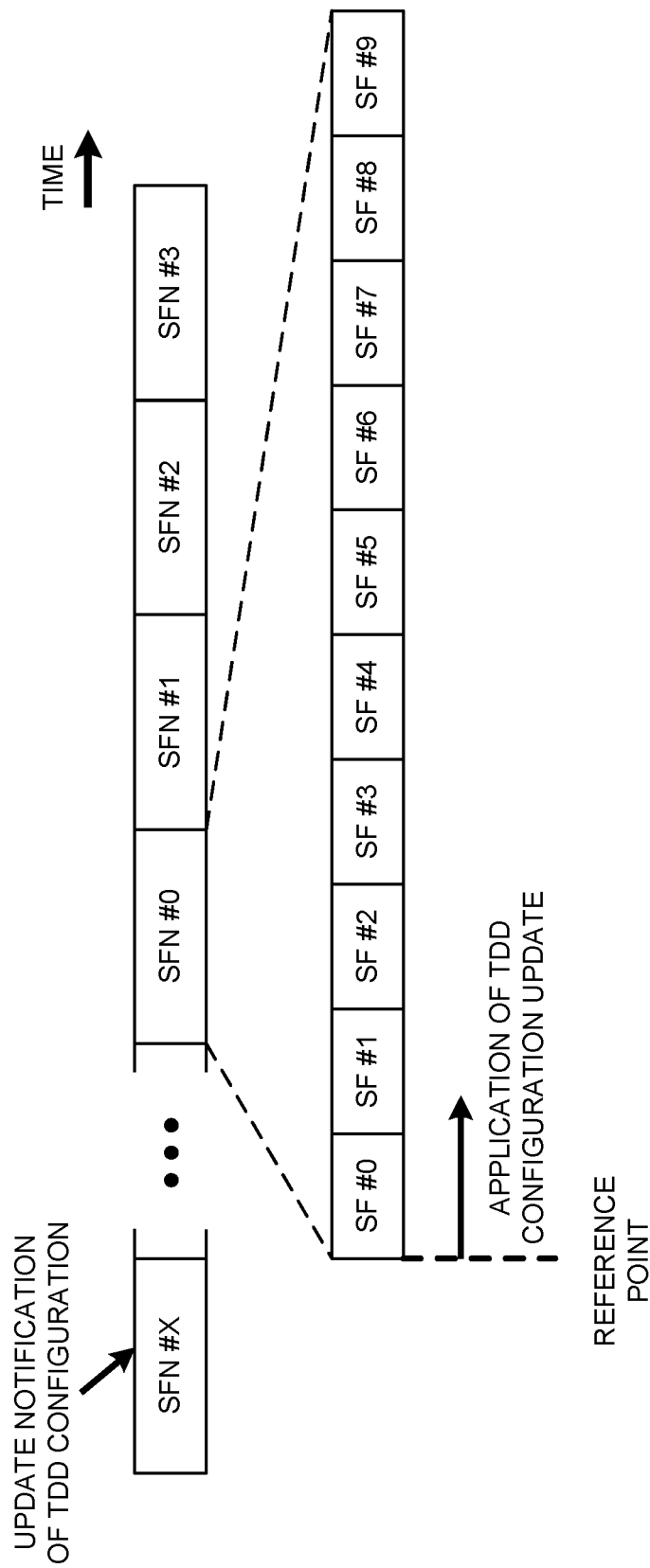
FIG. 1 is a diagram illustrating a first example of a reference point at a time of a change of a TDD configuration.

It has been studied for NR to make it possible to control a transmission direction in various time units (such as frames, subframes, slots and symbols).

For example, NR may support control of the transmission direction based on a cell-specific UL-DL configuration, a UE-specific UL-DL configuration and Slot Format Information or a Slot Format Indicator (SFI).

In addition, in this description, "UL-DL" may be read as a pattern of the transmission direction including at least one of DL and UL such as "UL-DL", "DL-UL", "DL-unknown-UL" and "UL-DL-unknown".

In this regard, "unknown" may mean a resource (duration) whose transmission direction is unknown, and may be referred to as "flexible". A user terminal (UE: User Equipment) may assume not to perform reception and/or not to perform transmission in the unknown resource. In the unknown resource, all signals may not be transmitted or received, or part of signals may be transmitted or received.

Furthermore, "cell-specific" may be read as phrases and terms such as "associated with a cell (CC)", "configured by a cell-specific higher layer signaling", "UE-common" and "UE-group common". "UE-specific" may be read as phrases such as "associated with a UE" and "configured by a UE-dedicated higher layer signaling".

A base station (that may be referred to as, for example, a BS (Base Station), a Transmitting/receiving Point (TRP), an eNodeB (eNB) or a gNB (NR NodeB)) may semi-statically configure the cell-specific UL-DL configuration and the UE-specific UL-DL configuration to the UE. Information of these UL-DL configurations may be notified to the UE by using, for example, a higher layer signaling.

In this regard, the higher layer signaling may be at least one of, for example, a Radio Resource Control (RRC) signaling, a Medium Access Control (MAC) signaling, and broadcast information, or a combination of these.

The MAC signaling may be, for example, an MAC Control Element (MAC CE) or an MAC Protocol Data Unit (PDU). The broadcast information may be, for example, a Master Information Block (MIB), a System Information Block (SIB), Remaining Minimum System Information (RMSI) or Other System Information (OSI).

The cell-specific UL-DL configuration and the UE-specific UL-DL configuration may be configured relative to a carrier to which TDD is configured. The cell-specific UL-DL configuration and/or the UE-specific UL-DL configuration are assumed to be configured by using a notification of a TDD configuration update (TDD config update) and a complete notification for an RRC reconfiguration (RRC Connection Reconfiguration Complete).

<Cell-Specific UL-DL Configuration>

The cell-specific UL-DL configuration may correspond to a pattern of UL-DL in a given duration (e.g., 0.5 ms, 0.625 ms, 1 ms, 1.25 ms, 2 ms, 2.5 ms, 5 ms and 10 ms). The given duration may be referred to as a UL-DL transmission periodicity, a UL-DL periodicity or a UL-DL pattern periodicity.

The UL-DL transmission periodicity may be associated with a numerology (e.g., SCS) and determined. For example, as the UL-DL transmission periodicity, 0.625 ms may be used when the SCS is 120 kHz, 1.25 ms may be used when the SCS is 60 kHz or more, and 2.5 ms may be used when the SCS is 30 kHz or more.

Information related to the cell-specific UL-DL configuration may include information such as the number of complete DL slots (full DL slots) that are contiguous from a beginning of each UL-DL pattern, and the number of complete UL slots (full UL slots) that are contiguous at an end of the pattern (from the end to a direction of the beginning).

The information related to the cell-specific UL-DL configuration may include information such as the number of DL symbols that continue to a last full DL slot of each UL-DL pattern, and the number of UL symbols that come before the first full UL slot of the pattern.

The UE may decide that a resource between a DL resource and a UL resource in the above given duration, in other words, a resource that is not either DL or UL (i.e., that is not indicated in particular) is an unknown resource.

In addition, in explanation of this description, DL and UL may be read interchangeably. Furthermore, information of contiguous slots/symbols may be information of non-contiguous slots/symbols.

<UE-Specific UL-DL Configuration>

The UE-specific UL-DL configuration may include information that instructs a transmission direction of an arbitrary slot included in the above-described UL-DL pattern. The UE may overwrite and decide transmission directions of one or a plurality of slots indicated by the cell-specific UL-DL configuration based on the UE-specific UL-DL configuration. That is, the UE-specific UL-DL configuration may be prioritized over the cell-specific UL-DL configuration, and used to decide the transmission direction. In addition, the transmission direction of a slot may be read as a transmission direction of a symbol in the slot.

Regarding, for example, an arbitrary slot in the above-described UL-DL transmission periodicity, the information related to the UE-specific UL-DL configuration may include, for example, information for specifying a slot, and information such as the number of DL symbols that are contiguous from a beginning of the slot to be specified and the number of UL symbols that are contiguous at the end of the slot to be specified.

In the above-described UL-DL transmission periodicity, UL and DL may be switched only once or may be switched a plurality of times. That is, a UL-DL switching periodicity may be the same as or may be different from the UL-DL transmission periodicity.

Furthermore, according to NR, two joined UL-DL pattern periodicities may be used. Each periodicity may be independently configured. When a first pattern periodicity is X ms and a second pattern periodicity is Y ms, a total periodicity may be expressed as X+Y ms. UL-DL patterns (UL-DL configurations) to be joined are each preferably DL-unknown-UL, yet are not limited to this.

In addition, the information related to the cell-specific UL-DL configuration and/or the information related to the UE-specific UL-DL configuration may include information that indicates that information of a plurality of pattern periodicities is included. For example, the information related to the cell-specific UL-DL configuration and/or the information related to the UE-specific UL-DL configuration may include 1-bit information that indicates that information of the second pattern periodicity is included. The UE may decide that a plurality of pattern periodicities are configured when the information is included.

<SFI>

The SFI may be used to dynamically control a transmission direction (at least one of UL, DL and flexible) per symbol included in a slot. The SFI may be included in slot format notification Downlink Control Information (DCI) transmitted on a downlink control channel (e.g., a group-common Physical Downlink Control Channel (PDCCH)).

The slot format notification DCI may be defined separately from DCI used to schedule data.

The slot format notification DCI may be referred to as an SFI DCI format, a DCI format 2_0, a DCI format 2A, a DCI format 2, an SFI-PDCCH or SFI-DCI. In addition, the "DCI format" may be used interchangeably with "DCI".

When monitoring the slot format notification DCI at a certain periodicity and detecting the DCI, the UE may decide formats of one or a plurality of slots (transmission directions per symbol in slots) based on a value indicated by a specific field included in the DCI. The specific field may be referred to as an SFI field. The SFI may be prioritized over the UE-specific UL-DL configuration and the cell-specific UL-DL configuration, and used to decide the transmission direction.

By the way, changing the semi-static UL-DL configuration in an RRC connected state where the above-described cell-specific UL-DL configuration and/or the UE-specific UL-DL configuration are used is an operation that has not been assumed by legacy LTE. Study on from when to perform an operation based on a post-change configuration in a case where a change notification of the semi-static UL-DL configuration is received has not yet advanced. Unless an appropriate change timing is used, there is a risk that recognition of the transmission direction does not match between the UE and the base station, and a communication throughput and frequency use efficiency deteriorate.

Therefore, the inventors of the present invention have conceived a method for deciding a timing at which a configuration change of the semi-static UL-DL configuration is reflected.

An embodiment according to the present disclosure will be described in detail below with reference to the drawings. A radio communication method according to each embodiment may be each applied alone or may be applied in combination.

(Radio Communication Method)

According to one embodiment, the UE may switch the UL-DL configuration based on the cell-specific UL-DL configuration and/or the UE-specific UL-DL configuration at a timing that comes after a specific timing and satisfies given conditions.

The specific timing may be referred to as a reference timing. Furthermore, a UL-DL configuration (TDD configuration) switch timing may be referred to a reference point at a time of a change of the TDD configuration (setting) or simply as a reference point or a reference timing. The UE may apply the post-change UL-DL configuration (configured TDD configuration) with the reference point as the start point. The UE preferably performs control such that a UL-DL transmission periodicity of the post-change UL-DL configuration starts from the reference point (the reference point corresponds to a slot #0 in the UL-DL configuration).

The above reference timing may be at least one of the followings or may be other timings.

(1) A timing at which TDD configuration update information (TDD config update) is received, (2) A timing at which an RRC reconfiguration (RRC Connection Reconfiguration) is received, (3) A timing at which a complete notification for the RRC reconfiguration (RRC Connection Reconfiguration Complete) is transmitted, and (4) A timing that passes a given time more from one of (1) to (3) the above timings.

In addition, the "timing" may mean a unit time (e.g., at least one of a symbol, a slot, a subframe and a frame) including these timings. Furthermore, "after the timing" may include these timings. The RRC reconfiguration may include the TDD configuration update information.

(4) The above given time may indicate a time (e.g., processing delay) that is necessary until the UL-DL configuration is switched after reception. The given time may be, for example, 8 symbols, 8 slots, 8 subframes, 8 ms, 10 symbols, 10 slots, 10 subframes or 10 ms. In addition, a value of the given time is not limited to these. Furthermore, the value of the given time may take a different value according to sub-carrier spacings of a Synchronization Signal Block (SSB), a downlink control channel (PDCCH) and a downlink data channel (PDSCH).

The reference point may be a beginning of a timing that comes after the reference timing and at which a System Frame Number (SFN) takes a first value next. For example, the first value may be 0, or may be a next SFN of an SFN including the reference timing, an SFN subsequent to the next SFN or a last SFN.

The reference point may be a beginning of a timing that comes after the reference timing and at which a Subframe Number (that may be referred to as an SF or a subframe index) takes a second value next. For example, the second value may be 0.

The reference point may be a beginning of a timing that comes after the reference timing and at which a slot number (that may be referred to as a slot index) takes a third value next. For example, the third value may be 0. In addition, the description will be explained below assuming that a beginning of a subframe #0 coincides with a beginning of a slot #0. However, the beginning of the subframe #0 may be configured to coincide with a beginning of another slot, or may be shifted from the beginning of the slot.

The reference point may be a beginning of a timing that comes after the reference timing and at which a symbol number (that may be referred to as a symbol index) takes a fourth value next. For example, the fourth value may be 0.

In addition, a plurality of values of the first to fourth values may be the same or may be different.

A plurality of parameters may be used to decide the reference point. For example, the reference point may be a beginning of a timing that comes after the reference timing and at which the SFN takes the first value (e.g., 0) and the subframe number takes the second value (e.g., 0) next.

FIG. 1 is a diagram illustrating a first example of the reference point at a time of a change of the TDD configuration. The drawings illustrating this example and examples of other reference points assume cases where the UE receives the TDD configuration update notification in the middle of an SFN #X. Furthermore, 1 frame is assumed to include ten subframes (SFs #0 to #9). Furthermore, 1 subframe is assumed to include four slots (Slots #0 to S3) (i.e., 1 slot=0.25 ms).

The reference timing in FIG. 1 is a timing at which the TDD configuration update notification is received. The reference point in FIG. 1 is a beginning of a timing that comes after the reference timing and at which SFN=0 holds and SF=0 holds next.

The reference point may be a beginning of a timing that comes after the reference timing, and at which the SFN takes the first value (e.g., 0), the subframe number takes the second value (e.g., 0) and the slot number takes the third value (e.g., 0) next.

Figure 2:
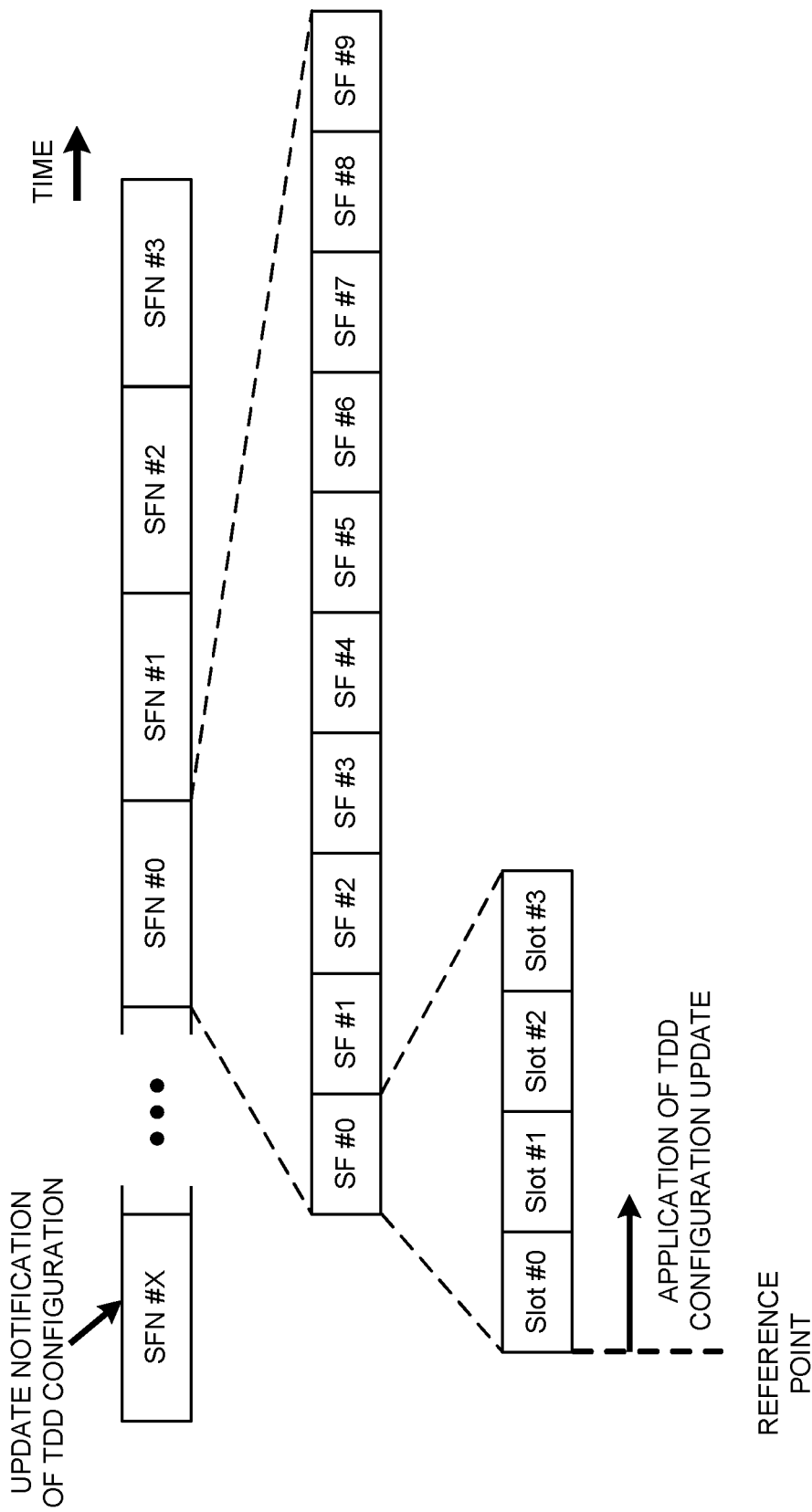
FIG. 2 is a diagram illustrating a second example of the reference point at the time of the change of the TDD configuration.

FIG. 2 is a diagram illustrating a second example of the reference point at the time of the change of the TDD configuration. The reference timing in FIG. 2 is a timing at which the TDD configuration update notification is received. The reference point in FIG. 2 is a beginning of a timing that comes after the reference timing and at which SFN=0 holds, SF=0 holds and Slot=0 holds next.

The reference point may be a beginning of a timing that comes after the reference timing, and at which the subframe number takes the second value (e.g., 0) in a next or subsequent SFN (a next or subsequent frame).

Figure 3:
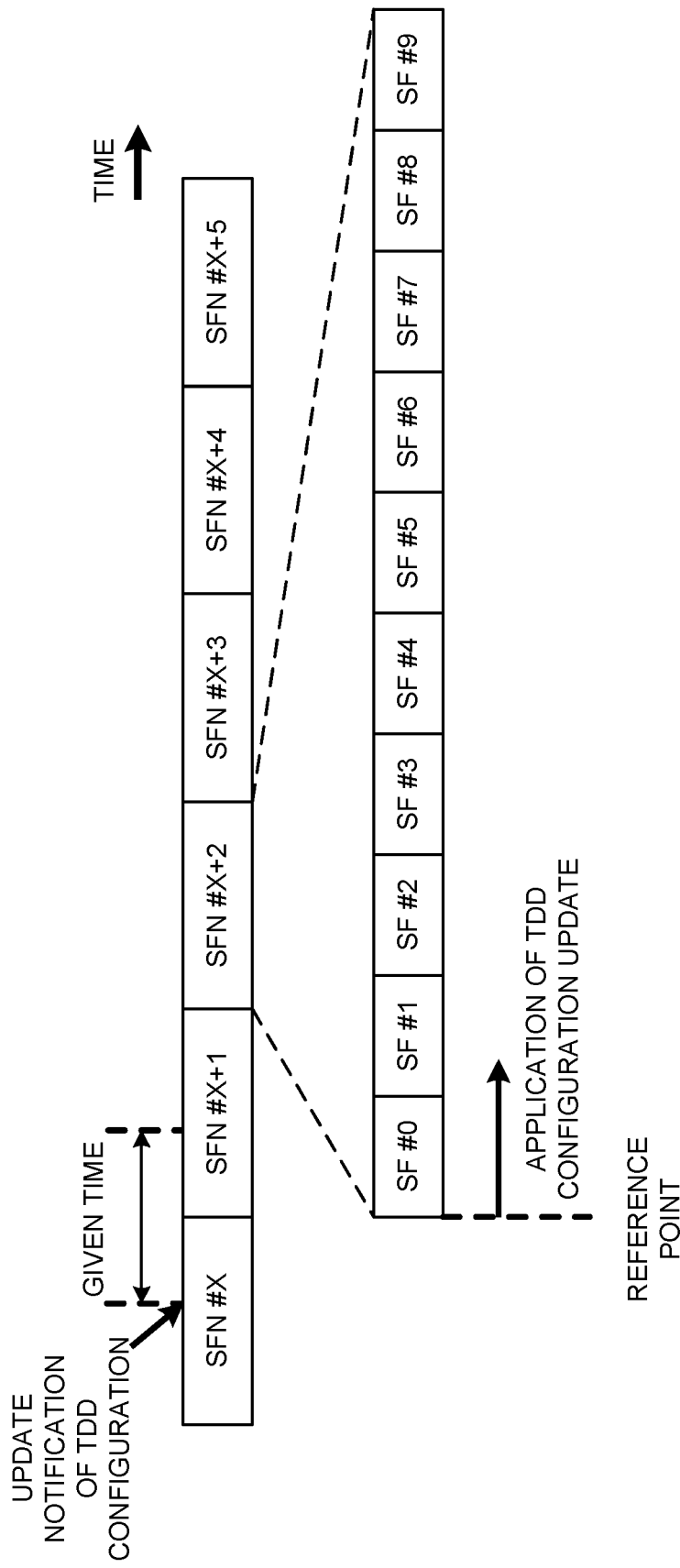
FIG. 3 is a diagram illustrating a third example of the reference point at the time of the change of the TDD configuration.

FIG. 3 is a diagram illustrating a third example of the reference point at the time of the change of the TDD configuration. The reference timing in FIG. 3 is a timing that passes a given time more from a timing at which the TDD configuration update notification is received. This example and the subsequent drawings assume that the above-described given time is 8 subframes. The reference point in FIG. 3 is a beginning of a timing that comes after the reference timing (in the middle of an SFN #X+1), and at which a next SFN (an SFN #X+2) comes and SF=0 holds.

The reference point may be a beginning of a timing that comes after the reference timing, and at which the subframe number takes the second value (e.g., 0) and the slot number takes the third value (e.g., 0) in a next or subsequent SFN (a next or subsequent frame).

Figure 4:
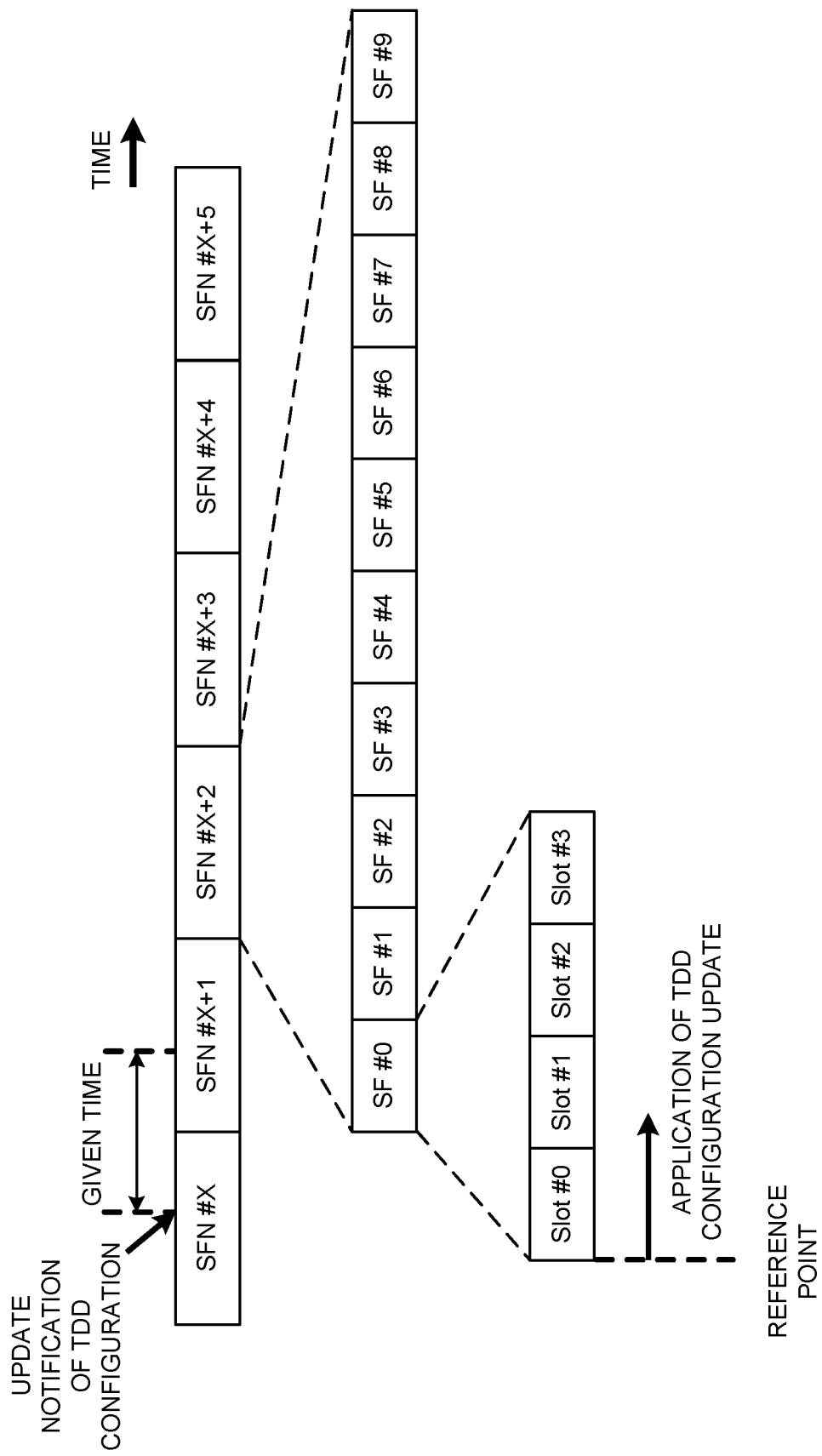
FIG. 4 is a diagram illustrating a fourth example of the reference point at the time of the change of the TDD configuration.

FIG. 4 is a diagram illustrating a fourth example of the reference point at the time of the change of the TDD configuration. The reference timing in FIG. 4 is a timing that passes a given time more from a timing at which the TDD configuration update notification is received. The reference point in FIG. 4 is a beginning of a timing that comes after the reference timing (in the middle of the SFN #X+1), and at which a next SFN (SFN #X+2) comes, SF=0 holds and Slot=0 holds.

In addition, the "beginning of the timing" may be read as an "end of the timing" or simply as a "timing. Furthermore, the "timing" may be read as a "timing obtained by applying an offset to the timing". Information of the offset may be notified to the UE by a higher layer signaling (e.g., RRC signaling), a physical layer signaling (e.g., DCI) or a combination of these signalings.

The reference point may come after the reference timing and may be a timing of a first DL symbol in the post-change UL-DL configuration. That is, the UE may start control based on the TDD configuration from a timing of a symbol that switches to DL first in a UL-DL periodicity of the configured TDD configuration.

Figure 5:
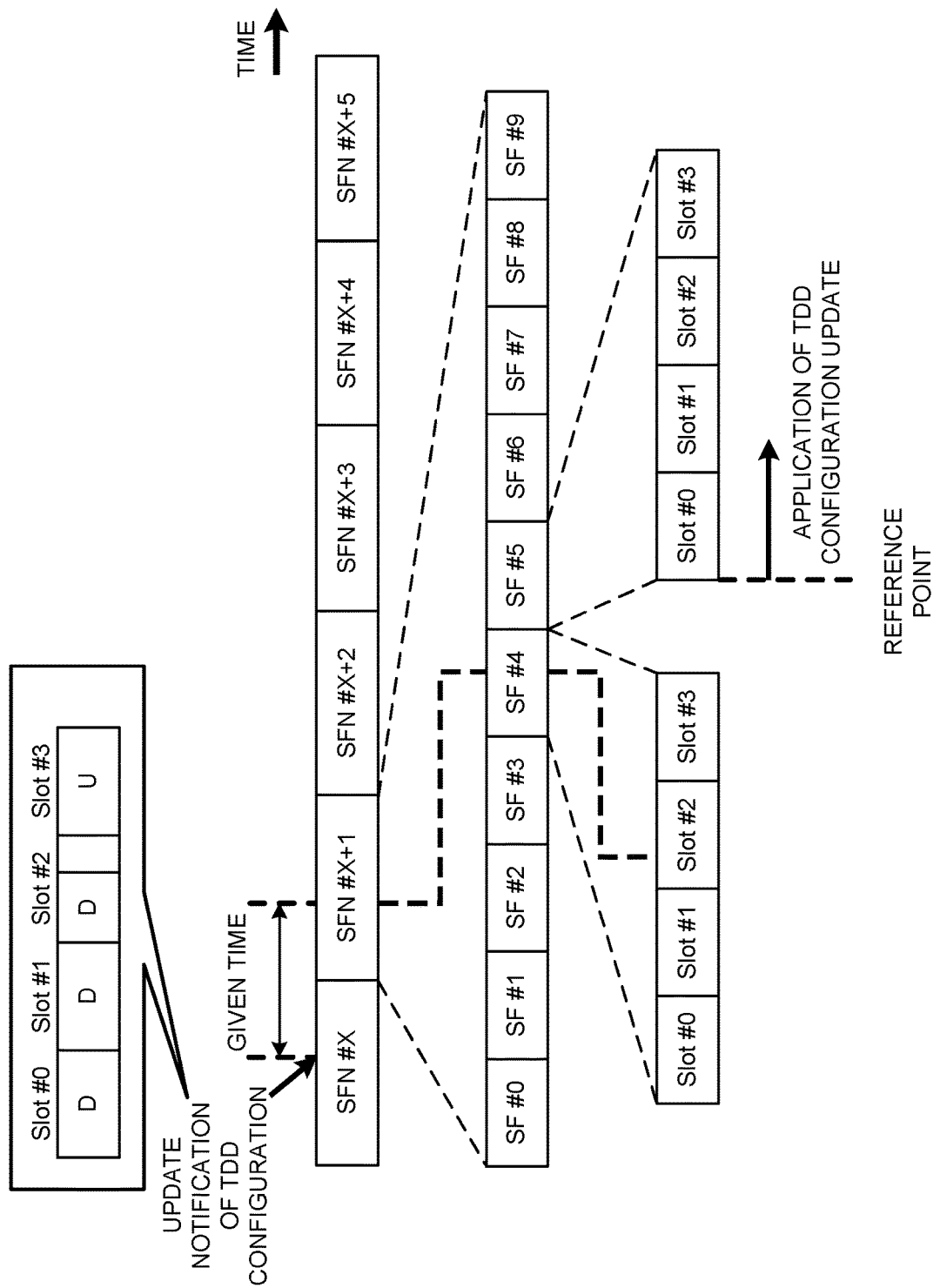
FIG. 5 is a diagram illustrating a fifth example of the reference point at the time of the change of the TDD configuration.

FIG. 5 is a diagram illustrating a fifth example of the reference point at the time of the change of the TDD configuration. The reference timing in FIG. 5 is a timing that passes a given time more from a timing at which the TDD configuration update notification is received. This example and the subsequent drawings assume that the reference timing is in the middle of the slot #2 of the SF #4 of the SFN #X+1.

Furthermore, the example in FIG. 5 assumes that the change notification instructs a TDD configuration (UL-DL transmission periodicity=1 ms) where the Slots #0 and #1 are full DL slots, the Slot #2 is a partial DL slot including the number of DL symbols that is a given number from the beginning, and, furthermore, the Slot #3 is a full UL slot.

The reference point in FIG. 5 comes after the reference timing (in the middle of the Slot #2 of the SF #4 of the SFN #X+1), and is a timing (the Slot #0 of the SF #5 of the SFN #X+1) of the first DL symbol in the post-change UL-DL configuration. In this case, the UE decides a transmission direction based on a pre-change UL-DL configuration in the SFs #0 to #4 of the SFN #X+1, and decides a transmission direction based on the post-change UL-DL configuration in the SF #5 or a subsequent SF of the SFN #X+1.

When the post-change UL-DL configuration is a combination of a plurality of (e.g., two) configurations, the reference point may come after the reference timing, and may be a timing of the first DL symbol in the first UL-DL configuration of the post-change UL-DL configurations. That is, the UE may start control based on these TDD configurations from the timing of the symbol that switches to DL first in a UL-DL pattern (switching occurs a plurality of times) that is realized by joining the UL-DL periodicities of a plurality of configured TDD configurations.

Figure 6:
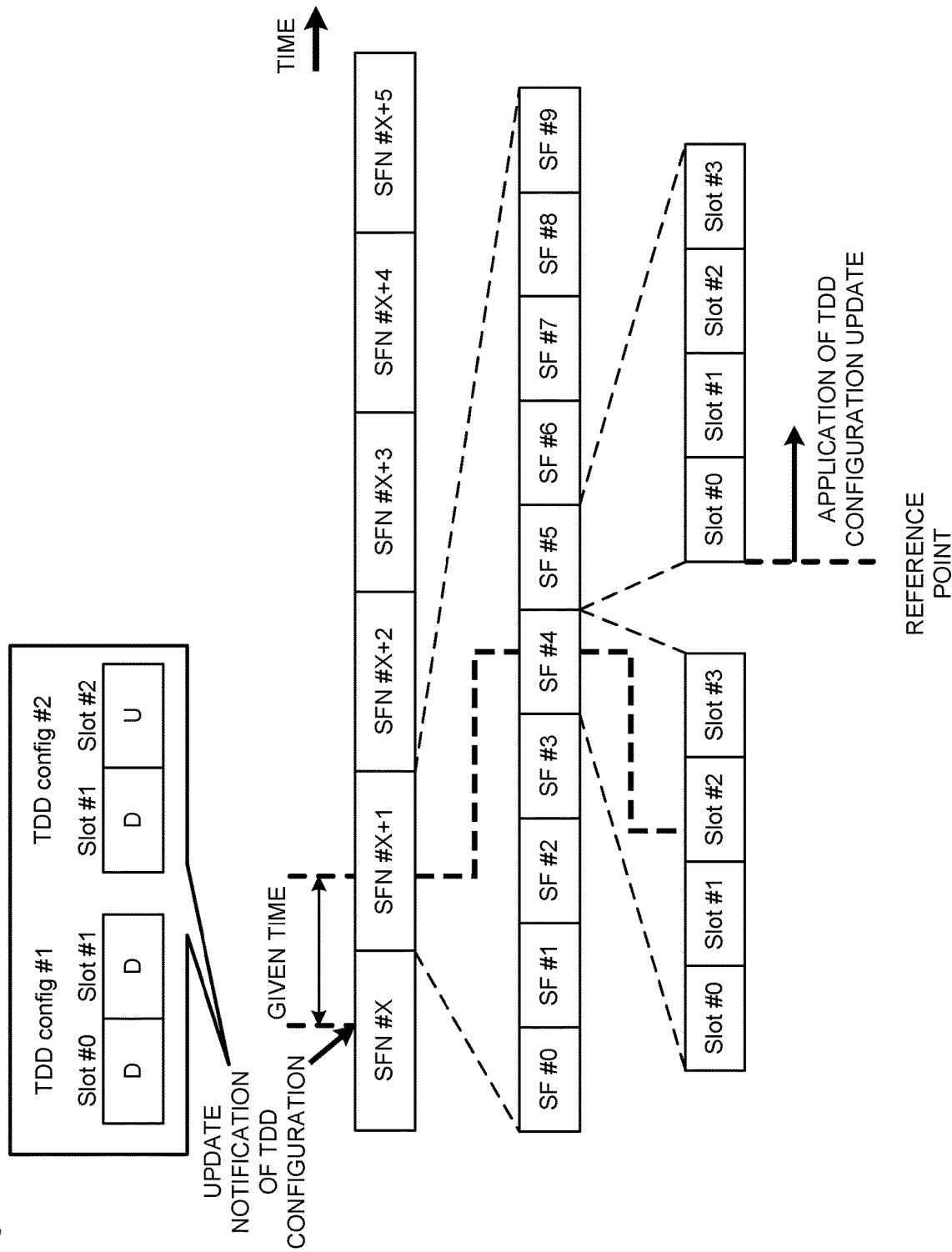
FIG. 6 is a diagram illustrating a sixth example of the reference point at the time of the change of the TDD configuration.

FIG. 6 is a diagram illustrating a sixth example of the reference point of at the time of the change of the TDD configuration. The reference timing in FIG. 6 is a timing that passes a given time more from a timing at which the TDD configuration update notification is received.

Furthermore, the example in FIG. 6 assumes that the change notification instructs a TDD configuration (a total UL-DL transmission periodicity=1 ms) including a first TDD configuration (TDD config #1) (UL-DL transmission periodicity=0.5 ms) where the Slots #0 and #1 are full DL slots, and a second TDD configuration (TDD config #2) (UL-DL transmission periodicity=0.5 ms) where the Slot #0 is a full DL slot and the Slot #1 is a full UL slot.

The reference point in FIG. 6 comes after the reference timing (in the middle of the Slot #2 of the SF #4 of the SFN #X+1), and is a timing (the Slot #0 of the SF #5 of the SFN #X+1) of first DL symbol in the first UL-DL configuration of the post-change UL-DL configurations. In this case, the UE decides a transmission direction based on a pre-change UL-DL configuration in the SFs #0 to #4 of the SFN #X+1, and decides a transmission direction based on the post-change UL-DL configuration in the SF #5 or a subsequent SF of the SFN #X+1.

In addition, when the post-change UL-DL configuration is applied to the symbol that switches to DL first in the post-change UL-DL configuration (the first UL-DL configuration of the post-change UL-DL configurations), the reference timing is preferably above (4). The UE can reliably reserve a margin for switching the UL-DL configuration.

Furthermore, information related to the reference point may be notified to the UE by a higher layer signaling (e.g., RRC signaling), a physical layer signaling (e.g., DCI) or a combination of these signalings.

The information related to the reference point may include information related to the reference timing (which one of the reference timings is used or a value of the given time), and information related to the given conditions (above-described first to fourth values).

According to the above-described one embodiment, the UE can apply a configuration change of a semi-static UL-DL configuration from an appropriate timing.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 7:
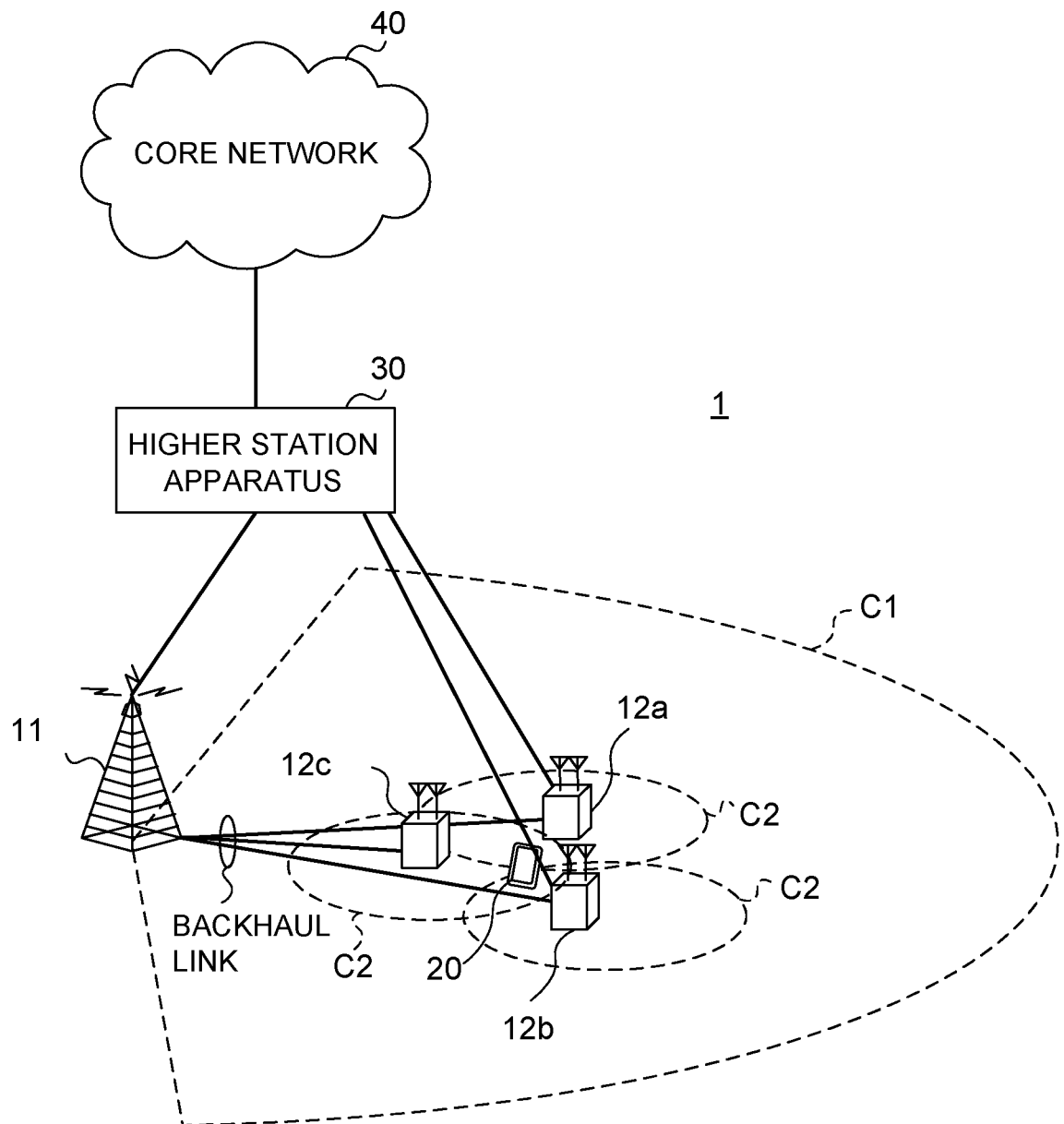
FIG. 7 is a diagram illustrating one example of a schematic configuration of a radio communication system according to one embodiment.

FIG. 7 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 7.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 may apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a sub-carrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain. For example, a case where sub-carrier spacings of constituent OFDM symbols are different and/or a case where the numbers of OFDM symbols are different on a certain physical channel may be read as that numerologies are different.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmitting/receiving point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmitting/receiving point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, DCI for scheduling DL data reception may be referred to as a DL assignment, and DCI for scheduling UL data transmission may be referred to as a UL grant.

The number of OFDM symbols used for the PDCCH may be conveyed on the PCFICH. Transmission acknowledgement information (also referred to as, for example, retransmission control information, HARQ-ACK or ACK/NACK) of a Hybrid Automatic Repeat reQuest (HARQ) for the PUSCH may be conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

(Radio Base Station)

Figure 8:
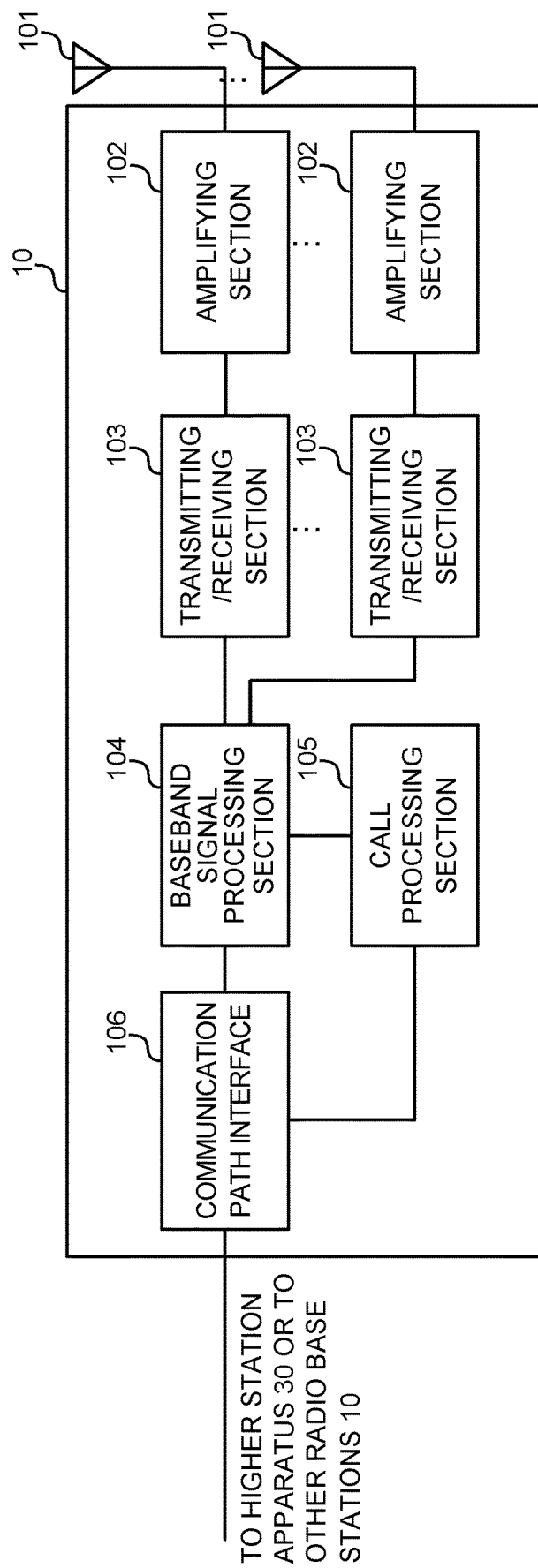
FIG. 8 is a diagram illustrating one example of an overall configuration of a radio base station according to the one embodiment.

FIG. 8 is a diagram illustrating one example of an overall configuration of the radio base station according to the one embodiment. The radio base station 10 includes pluralities of transmitting/receiving antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present disclosure. In this regard, the transmitting/receiving sections 103 may be composed as an integrated transmitting/receiving section or may be composed of transmission sections and reception sections.

Meanwhile, each amplifying section 102 amplifies a radio frequency signal received by each transmitting/receiving antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as a configuration and release) of a communication channel, state management of the radio base station 10 and radio resource management.

The communication path interface 106 transmits and receives signals to and from the higher station apparatus 30 via a given interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 may perform transmission and/or reception based on an Uplink-Downlink (UL-DL) configuration configured to the user terminal 20.

Figure 9:
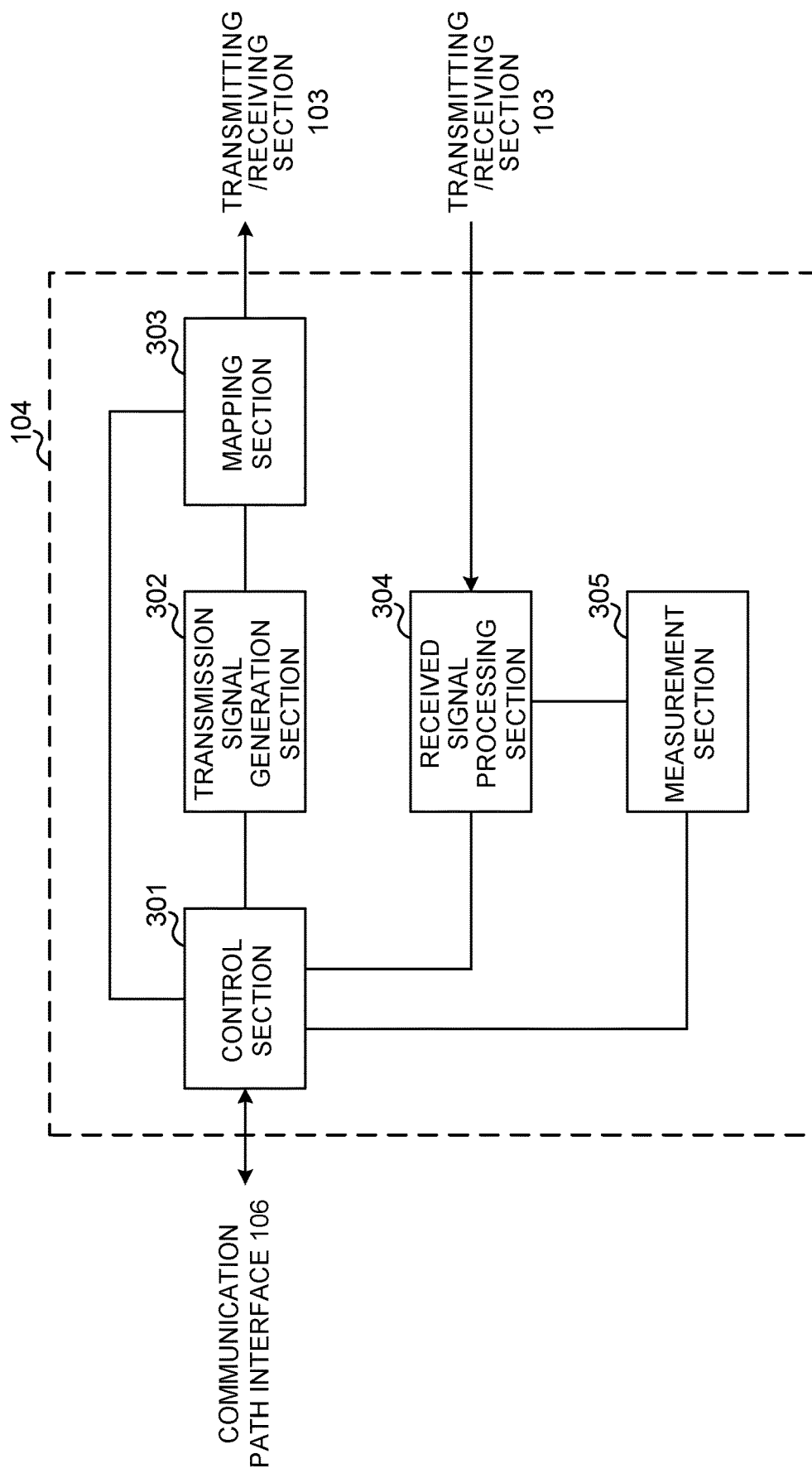
FIG. 9 is a diagram illustrating one example of a function configuration of the radio base station according to the one embodiment.

FIG. 9 is a diagram illustrating one example of a function configuration of the radio base station according to the one embodiment of the present disclosure. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may perform control to transmit to the user terminal 20 update information of the UL-DL configuration (that may be referred to as a TDD configuration (TDD config.)) via a higher layer signaling (e.g., RRC signaling). The control section 301 may decide a switch timing based on the update information, and perform the control.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 10:
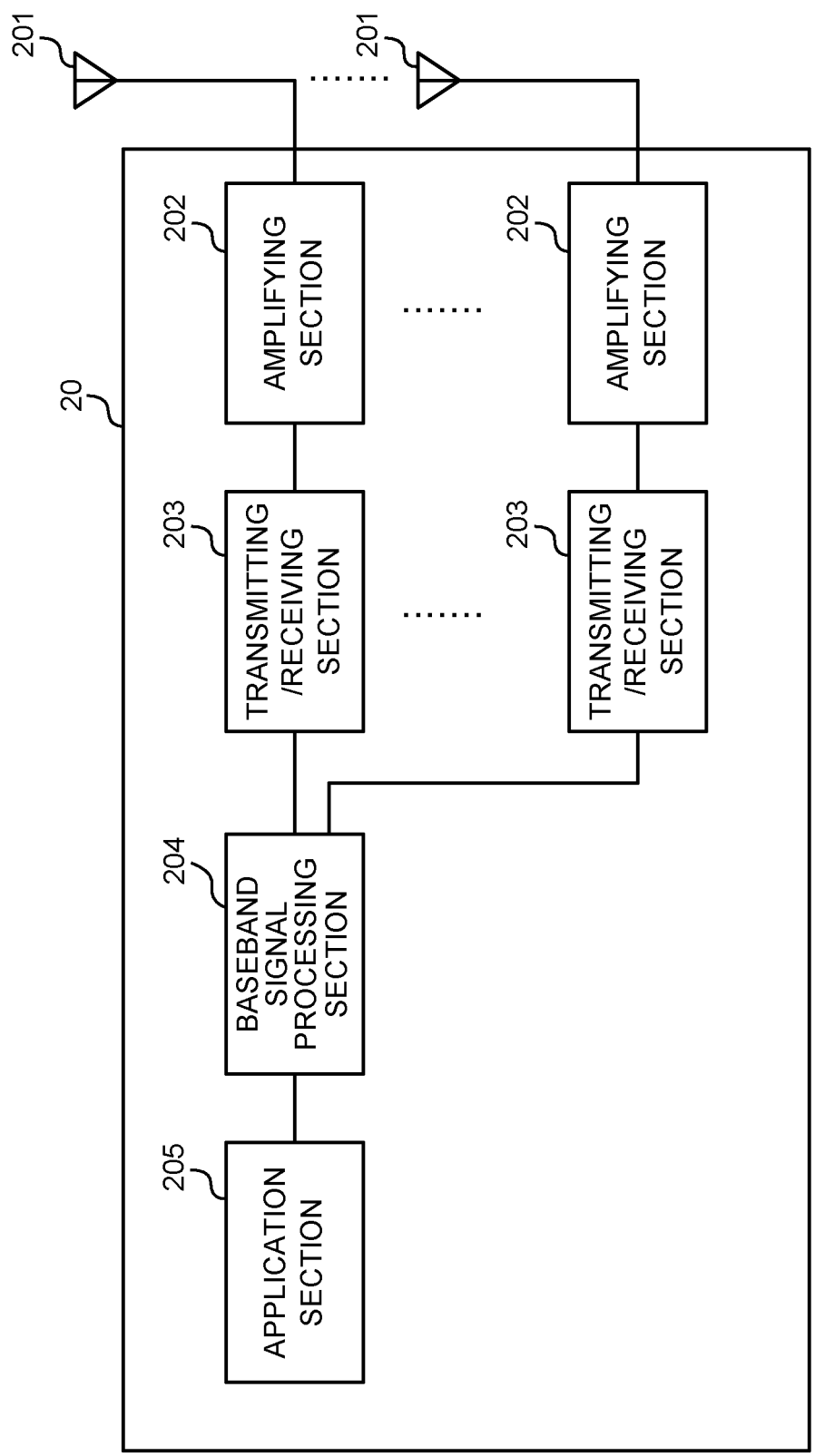
FIG. 10 is a diagram illustrating one example of an overall configuration of a user terminal according to the one embodiment.

FIG. 10 is a diagram illustrating one example of an overall configuration of the user terminal according to the one embodiment. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmitting/receiving circuits or transmitting/receiving apparatuses described based on the common knowledge in the technical field according to the present disclosure. In this regard, the transmitting/receiving sections 203 may be composed as an integrated transmitting/receiving section or may be composed of transmission sections and reception sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmitting/receiving antenna 201.

Each transmitting/receiving section 203 performs transmission and/or reception based on the Uplink-Downlink (UL-DL) configuration.

Figure 11:
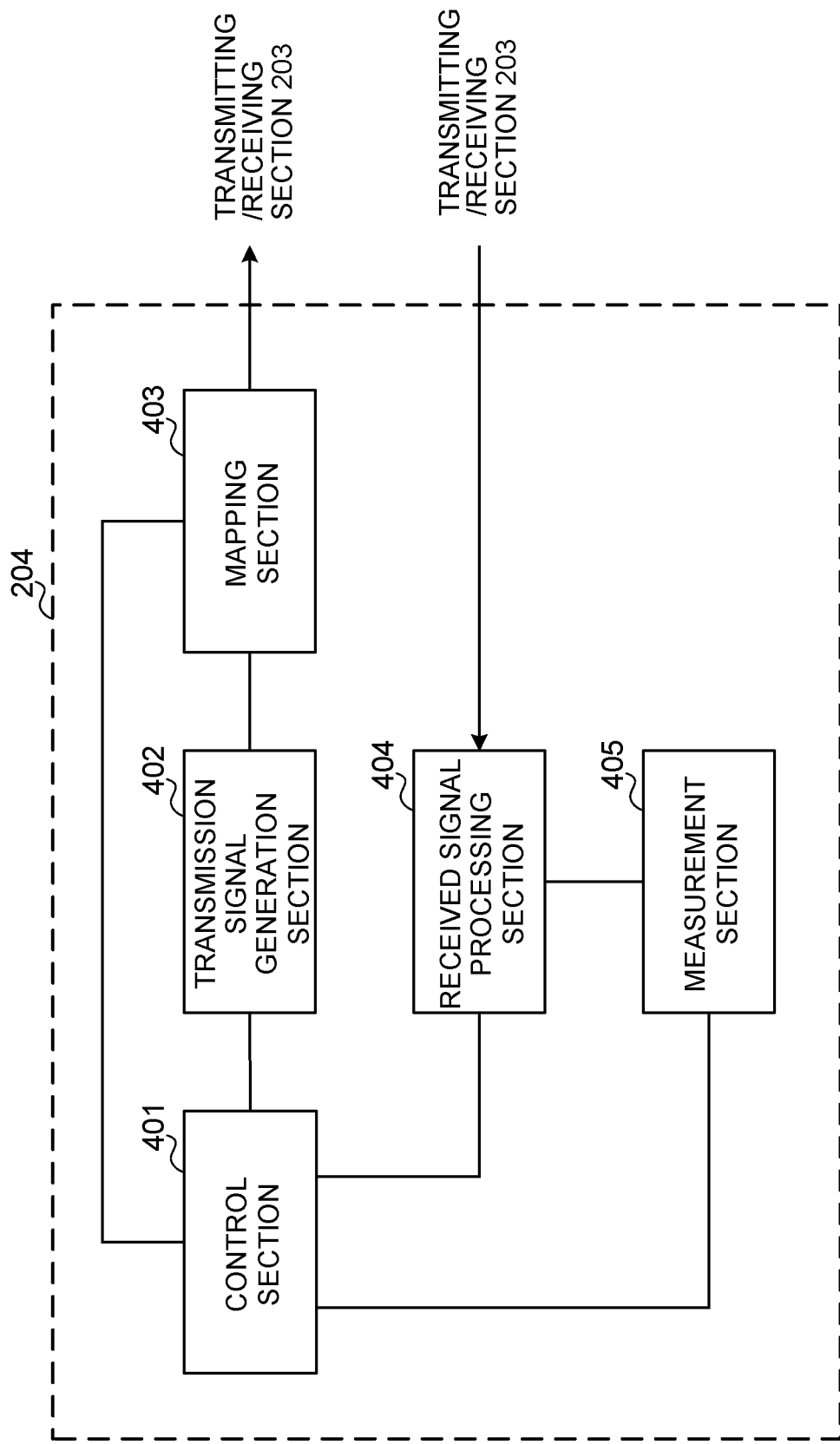
FIG. 11 is a diagram illustrating one example of a function configuration of the user terminal according to the one embodiment.

FIG. 11 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may decide a transmission direction in slot and/or symbol units based on the semi-statically configured Uplink-Downlink (UL-DL) configuration. The UL-DL configuration may be assumed to include information related to the transmission direction in at least the slot unit.

The control section 401 may control switching of the UL-DL configuration based on the update information of the UL-DL configuration (that may be referred to as the TDD configuration (TDD config.)) notified via the higher layer signaling (e.g., RRC signaling). The control section 401 may perform control to perform the switching at a timing that comes after a specific timing and satisfies given conditions.

The above specific timing may be a timing at which the above update information is received, a timing at which a complete notification for an RRC reconfiguration is transmitted, and a timing that passes a given time more from these timings.

The timing that satisfies the above given conditions may be a timing at which a system frame number takes a first value (e.g., 0), and a subframe number takes a second value (e.g., 0) next.

The timing that satisfies the above given condition may be a timing at which the system frame number takes the first value (e.g., 0), the subframe number takes the second value (e.g., 0) and a slot number takes the third value (e.g., 0) next.

The timing that satisfies the above given condition may be a timing of a first DL symbol in the UL-DL configuration indicated by the update information.

The timing that satisfies the above given conditions may be a timing of a first DL symbol in a first UL-DL configuration (or an n (n=1, 2, 3 . . . )th UL-DL configuration) of a plurality of UL-DL configurations when the above update information includes a plurality of UL-DL configurations.

Furthermore, when obtaining from the received signal processing section 404 various pieces of information notified from the radio base station 10, the control section 401 may update a parameter that is used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 12:
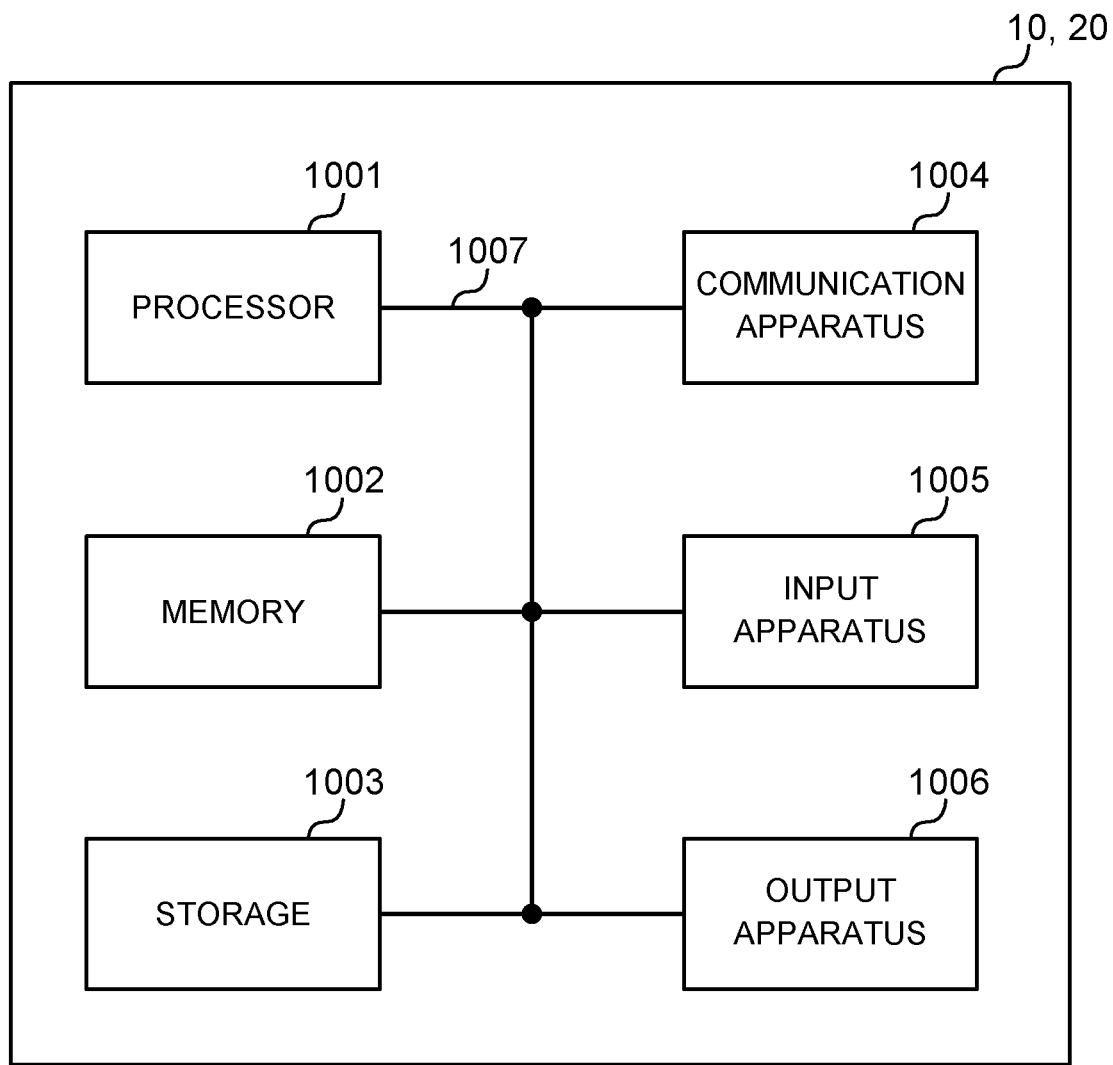
FIG. 12 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 12 is a diagram illustrating one example of the hardware configurations of the radio base station and the user terminal according to the one embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or control writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmitting/receiving antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

(Modified Example)

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a sub slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may b e expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying the given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be interchangeably used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
a receiver that receives a Radio Resource Control (RRC) reconfiguration message; and
a processor that controls to perform a switching of symbol-based Uplink-Downlink (UL-DL) configuration at a timing of a first DL symbol of the symbol-based UL-DL configuration indicated by update information of the symbol-based UL-DL configuration included in the RRC reconfiguration message after a given time passes from a reception of the RRC reconfiguration message;
wherein a signal transmission direction of each of the symbol-based UL-DL is included in a set of a slot, and is set to one of a downlink, an uplink or a flexible indicating the uplink and the downlink according to a specific format, and wherein a group-common Physical Downlink control channel (GC-PDCCH) includes a Slot Format Indicator, SFI, field for indicating a slot format of the set of the UL-DL symbol of the slot,
wherein the update information includes:
information indicating the number of contiguous DL slots from a beginning to a direction of the end in the symbol-based UL-DL configuration,
information indicating the number of contiguous UL slots from the end to a direction of the beginning in the symbol-based UL-DL configuration,
information indicating the number of DL symbols following after a last DL slot of the number of the contiguous DL slots, and
information indicating the number of UL symbols following before a first UL slot of the number of the contiguous UL slots.

2. The terminal according to claim 1, wherein the given time is a processing delay of 10 ms.

3. A radio communication method for a terminal, comprising:
receiving a Radio Resource Control (RRC) reconfiguration message; and
controlling to perform a switching of symbol-based Uplink-Downlink (UL-DL) configuration at a timing of a first DL symbol of the symbol-based UL-DL configuration indicated by update information of the symbol-based UL-DL configuration included in the RRC reconfiguration message after a given time passes from a reception of the RRC reconfiguration message;
wherein a signal transmission direction of each of the symbol-based UL-DL is included in a set of a slot, and is set to one of a downlink, an uplink or a flexible indicating the uplink and the downlink according to a specific format, and wherein a group-common Physical Downlink control channel (GC-PDCCH) includes a Slot Format Indicator, SFI, field for indicating a slot format of the set of the UL-DL symbol of the slot,
wherein the update information includes:
information indicating the number of contiguous DL slots from a beginning to a direction of the end in the symbol-based UL-DL configuration,
information indicating the number of contiguous UL slots from the end to a direction of the beginning in the symbol-based UL-DL configuration,
information indicating the number of DL symbols following after a last DL slot of the number of the contiguous DL slots, and
information indicating the number of UL symbols following before a first UL slot of the number of the contiguous UL slots.

4. A system comprising a terminal and a base station, wherein the terminal comprises:
a receiver that receives a Radio Resource Control (RRC) reconfiguration message; and
a processor that controls to perform a switching of symbol-based Uplink-Downlink (UL-DL) configuration at a timing of a first DL symbol of the symbol-based UL-DL configuration indicated by update information of the symbol-based UL-DL configuration included in the RRC reconfiguration message after a given time passes from a reception of the RRC reconfiguration message;
wherein a signal transmission direction of each of the symbol-based UL-DL is included in a set of a slot, and is set to one of a downlink, an uplink or a flexible indicating the uplink and the downlink according to a specific format, and wherein a group-common Physical Downlink control channel (GC-PDCCH) includes a Slot Format Indicator, SFI, field for indicating a slot format of the set of the UL-DL symbol of the slot, and the base station comprises:

a transmitter that transmits the RRC reconfiguration message, wherein the update information includes:

information indicating the number of contiguous DL slots from a beginning to a direction of the end in the symbol-based UL-DL configuration, information indicating the number of contiguous UL slots from the end to a direction of the beginning in the symbol-based UL-DL configuration, information indicating the number of DL symbols following after a last DL slot of the number of the contiguous DL slots, and information indicating the number of UL symbols following before a first UL slot of the number of the contiguous UL slots.

* * * * *